US008532563B2

(12) United States Patent
Shin et al.

(10) Patent No.: US 8,532,563 B2
(45) Date of Patent: Sep. 10, 2013

(54) PORTABLE ELECTRONIC DEVICE WITH CONFIGURABLE OPERATING MODE

(75) Inventors: Ji Seop Shin, Namyangju-si (KR); Sung-Gul Hwang, Seoul (KR); Sangsoo Park, Seoul (KR); Ho Yeon Won, Seoul (KR)

(73) Assignee: Motorola Mobility LLC, Libertyville, IL (US)

( * ) Notice: Subject to any disclaimer, the term of this patent is extended or adjusted under 35 U.S.C. 154(b) by 403 days.

(21) Appl. No.: 12/847,580

(22) Filed: Jul. 30, 2010

(65) Prior Publication Data

US 2012/0028686 A1    Feb. 2, 2012

(51) Int. Cl.
*H04H 60/09*    (2008.01)
(52) U.S. Cl.
USPC ......... 455/3.04; 455/3.06; 455/127; 455/566; 340/568.1
(58) Field of Classification Search
USPC .................. 455/3.04, 3.06, 127, 566, 575.1, 455/90.3, 128, 550.1; 341/20; 340/568.1, 340/568.7
See application file for complete search history.

(56) References Cited

U.S. PATENT DOCUMENTS

| 6,529,144 | B1 * | 3/2003 | Nilsen et al. .................... 341/20 |
| 7,865,831 | B2 * | 1/2011 | Dooley et al. ................. 715/719 |
| 7,873,849 | B2 * | 1/2011 | Mucignat et al. ............. 713/323 |
| 8,046,928 | B2 * | 11/2011 | Choi ........................... 33/366.12 |
| 8,234,512 | B2 * | 7/2012 | Mucignat et al. ............. 713/323 |
| 2001/0028798 | A1 * | 10/2001 | Manowitz et al. ............. 396/429 |
| 2005/0086158 | A1 * | 4/2005 | Clare ............................. 705/38 |
| 2009/0046076 | A1 * | 2/2009 | Bychkov et al. .............. 345/173 |
| 2010/0235667 | A1 * | 9/2010 | Mucignat et al. ............. 713/323 |
| 2011/0093729 | A1 * | 4/2011 | Mucignat et al. ............. 713/323 |
| 2012/0156997 | A1 * | 6/2012 | Kim et al. .................... 455/41.2 |

OTHER PUBLICATIONS

Sorenson Lighted Controls, SoLiCo Tilt & Vibration Switch Catalog, Product Change Notices SoLiCo Indicators Mec Switches Tilt & Vibration Products Tact Switches Switch/Breaker Boots, http://www.solico.com/Tilt&Vibration2.shtml, Mar. 16, 2010, all pages.
APEM Rocker Switches, Joysticks and Membranes, KR Series-Rocker Switches, Illuminated & Non-Illuminated Power Rocker Switches, http://www.apem/com/rocker.html, Mar. 16, 2010, all pages.
Fullpower Technologies, Inc., Fullpower Camera-Phone Solutions, The Next Breakthrough, http://www.fullpower.com/?Page-Topics &Sides=CameraPhones, Mar. 23, 2010, all pages.
HowStuffWorks, "Car-alarm Motion and Tilt Sensors", http://auto.howstuffworks.com/car-alarm4.htm, Mar. 16, 2010, all pages.

* cited by examiner

*Primary Examiner* — Minh D Dao

(57) ABSTRACT

A portable electronic device including a user interface, a sensor configured to provide an output signal when the device is oriented from resting on a first housing surface portion to resting on a second housing surface portion, and a controller coupled to the user interface and to the sensor, wherein the controller is configured to invoke a mode of operation in response to an output signal from the sensor and wherein the mode of operation is indicated at the user interface.

16 Claims, 5 Drawing Sheets

PORTABLE ELECTRONIC DEVICE WITH CONFIGURABLE OPERATING MODE

FIELD OF THE DISCLOSURE

The present disclosure relates generally to electronic devices and, more particularly, to configuring an operating mode of a portable electronic device based on orientation of the device relative to a surface.

BACKGROUND

The sensing of a motion sequence using a motion sensor for the purpose of activating functions of electronic devices is known generally. For example, U.S. Pat. No. 6,529,144 entitled "Method and Apparatus for Motion Activated Control of an Electronic Device" assigned to Motorola, Inc. discloses a cellular telephone or other handheld electronic device that detects motion sequences of the device and performs functionality associated with the detected motion. The motion sequences may be programmed by the user or may be pre-programmed in the device. The exemplary motion sequences disclosed in the Motorola Patent include successive shaking of the device with a specified frequency, and the functions performed by the device include activate/de-activate backlighting, scrolling and selection characters or menu items.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
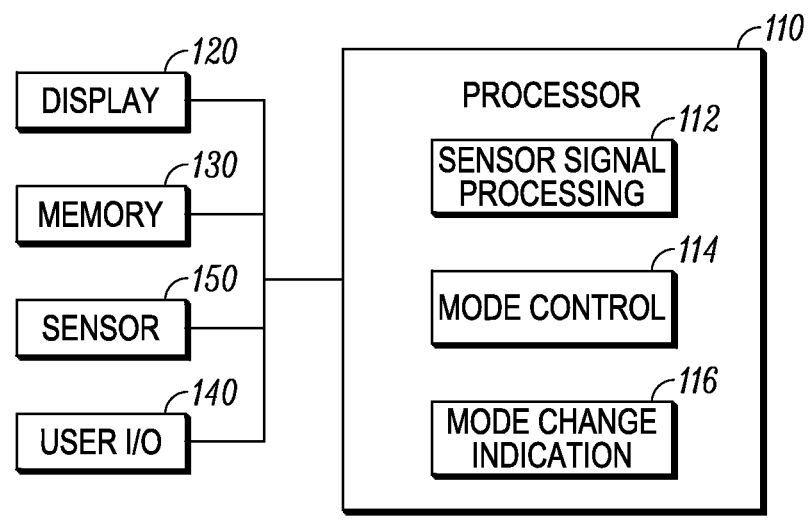
FIG. 1 illustrates a schematic of an electronic device.
Figure 2:
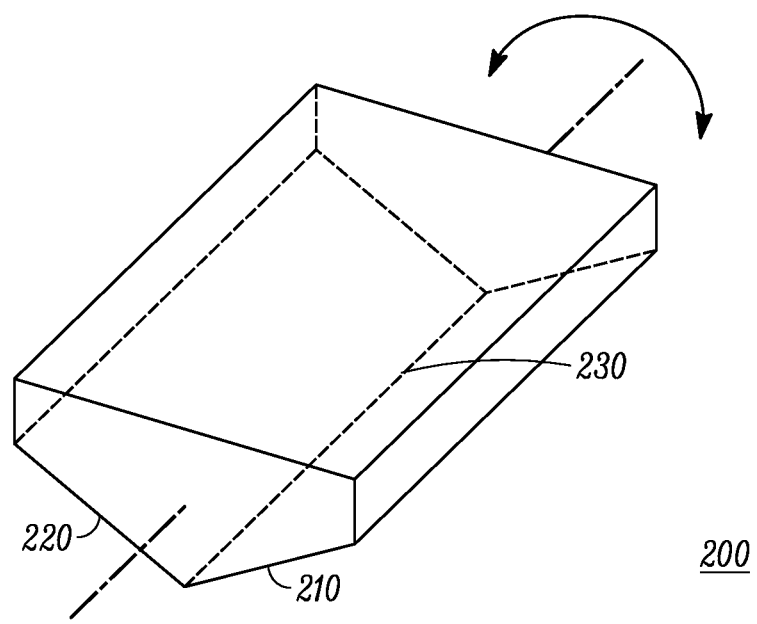
FIG. 2 illustrates a first electronic device housing portion.

FIG. 1 illustrates an electronic device 100 comprising a controller 110 communicably coupled to a user interface. In the embodiment of FIG. 2, the user interface includes a display component 120 and an audio interface described below. In other embodiments the user interface may not include a visual interface. The exemplary controller is a digital processor that executes software or firmware stored in a memory device 130, which may be embodied as RAM, ROM or as other memory devices or a combination thereof. Thus configured, the electronic device may run firmware or various applications upon the processor executing code or instructions stored in memory. In some instantiations, one or more applications may run on an operating system or some other low level program running on the device. The applications, operating systems and other programs may be proprietary or non-proprietary.

In one embodiment, the electronic device is implemented as a portable handheld device like a cell phone, a smart phone, a personal digital assistant, a portable electronic game, a portable media device, or as some other handheld electronic device. The electronic device may also be implemented as portable computer or include a general purpose computer. In FIG. 1, the user interface of the electronic device also includes user inputs/outputs 140, the particular form of which depends on the particular implementation of the device. The user inputs may be embodied as a keyboard, keypad, trackball, touchpad, microphone, etc. that is integrated with the device. In some embodiments, the user input is integrated with the display component in the form of a touch screen. The user input may also be embodied as a combination of these and other user inputs. Alternatively, one or more of the user inputs may be implemented as a discrete entity like an accessory or other a hand-manipulatable device. The user output may be embodied as an audio output or as a signal interface for an accessory, like an external display, among other known outputs. The electronic device may also include a wireless transceiver that interfaces with user inputs and outputs like a wireless headset. Such a transceiver may be embodied as a Bluetooth device or other near space transceiver that communicates wirelessly with a remote device or accessory. The electronic device thus includes a user interface that may be embodied as a visual or audible or tactile input or output or a combination thereof.

According to one aspect of the disclosure, the electronic device comprises a housing portion having at least a first surface portion and a second surface portion, wherein the device may be oriented to rest on at least one of the surface portions at a particular time. When the device is resting on a surface portion the device is generally in contact with another surface, for example, a desk, table, wall, a user's body part, or some other surface that is not part of the device. As suggested above, the housing portion may be that of a portable handheld device like a cell phone, a smart phone, a personal digital assistant, a portable electronic game, a media device, or some other handheld device or that of an accessory like a keyboard, keypad, trackball, touchpad, microphone, or other hand-manipulatable device.

Figure 3:
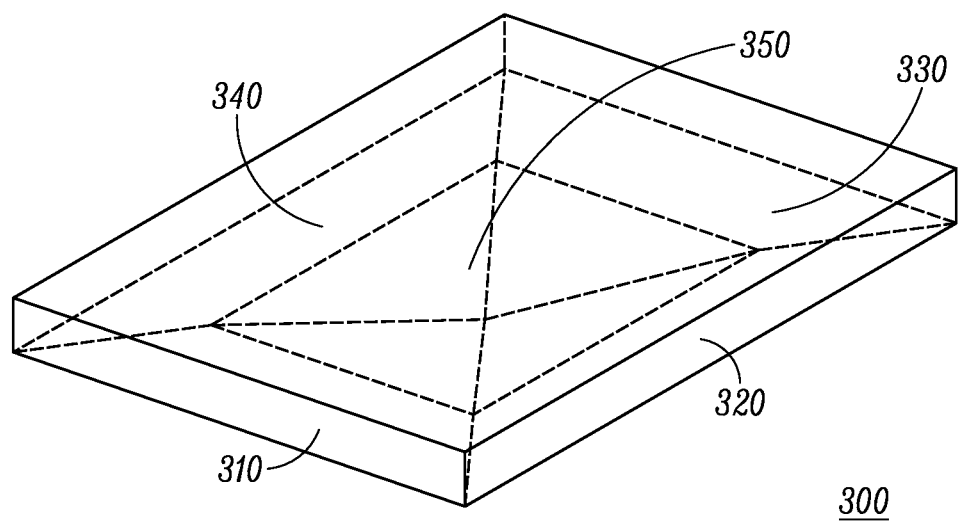
FIG. 3 illustrates a second electronic device housing portion.

In FIG. 2, the housing portion 200 includes a first surface portion 210 and a second surface portion 220 wherein the first surface portion is a first facet and the second surface portion is a second facet. The first facet and the second facet are generally non-parallel and intersect at a boundary, which is in the form of a protruding ridge 230. More generally however, the surface portions need not be faceted portions separated by a boundary or ridge, but instead may be part of a continuous surface as described further below. In FIG. 2, the facets may be flat or curved with either a convex or concave shape. The faceted surfaces 210 and 220 are arranged symmetrically on the housing portion such the housing portion 200 may rest on either surface portion 210 or surface portion 220 when unattended. More generally however, the faceted surfaces need not be formed symmetrically to enable the housing portion to rest on either surface portion, provided that the surface portions are sized and situated to stably support the housing portion without tipping. Thus configured the device and particularly the housing portion may rocked between the first and second surface portions by tipping or teetering the housing portion about the ridge by application of an external force. In the embodiment of FIG. 2, the device will remain stably oriented on a surface portion in the absence of an external force. FIG. 3 illustrates an alternative housing portion 300 having four symmetrically arranged facets 310, 320, 330 and 340. In other embodiments, the housing portion may have some other number of facets separated by protruding ridges about which the device may be tipped to change the surface portion in which the device rests. An embodiment with three facets is described further below.

In an alternative embodiment, the faceted surfaces are sized and situated to bias the housing portion to return to rest on a particular surface when tipped to rest on one of the other surfaces. In FIG. 2, for example, the first and second surface portions 210 and 220 may be configured asymmetrically such that the housing portion 200 tends to rest on one or the other of the surface portions 210 or 220 when unattended. In this alternative embodiment, the housing portion may be tipped about the ridge 230 from resting on the surface portion on which the device is biased to rest to the other surface portion. In the alternative embodiment, upon removal of the external force, the housing portion will return to rest on the surface portion to which it is biased. In FIG. 3, the housing portion may also be embodied with asymmetrically configured surface portions such that the device is biased to rest on a particular surface portion or on one of a subset of the total number of surface portions. In another alternative configuration, the housing portion of FIG. 3 may include a surface portion 350 instead of the apex defined by the surface portions 310, 320, 330 and 340. The surface portion 350 could be dimensioned such that the housing portion is biased to rest on the surface portion 350 when tipped toward one of the other surface portions 310, 320, 330 or 340.

In FIG. 1, the device also includes a sensor 150 configured to detect a change in orientation of the device and to provide a corresponding output signal in response to the change in orientation. Generally, the sensor may comprise multiple sensors that different components of acceleration or that detect different orientations of the device. For example, the sensor may be embodied as one or more accelerometers and/or gyroscopes or as any other motion sensor or sensors capable of detecting a change in the orientation of the device. Tilt sensors and various other sensors suitable for detecting the orientation or change in orientation of the housing are also known in the art. For example, each surface portion or facet of the housing portion may have associated therewith a sensor that detects when the housing portion rests on the corresponding facet of surface portion. In this regard, one or more accelerometers may provide signals from which the processor may determine the orientation or the surface portion on which the housing was positioned to rest, at least momentarily.

Figure 4:
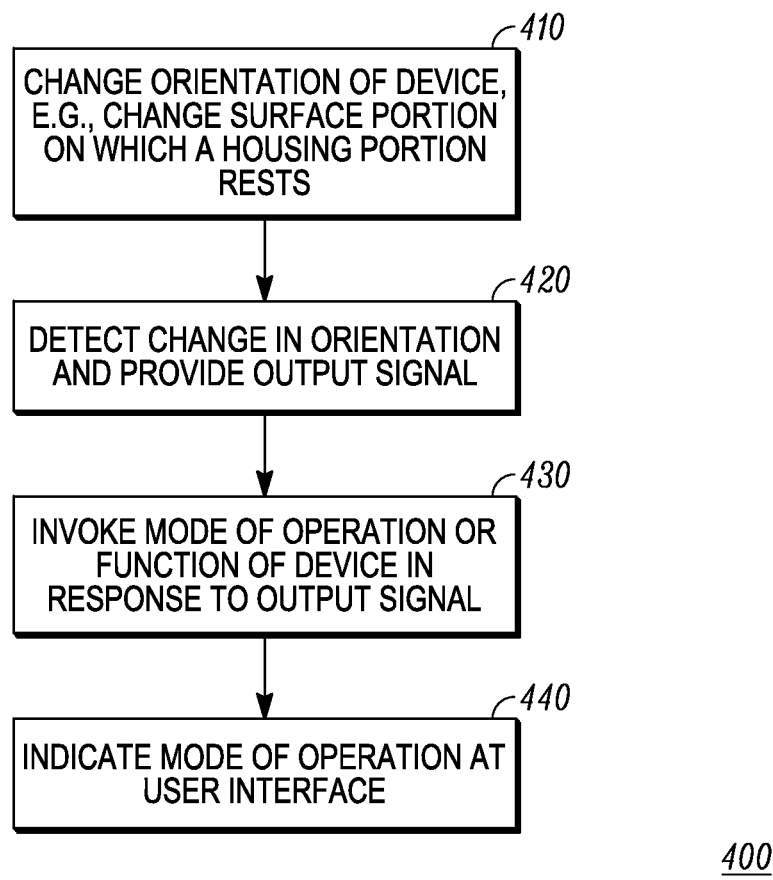
FIG. 4 illustrates a process flow diagram.

The sensor is coupled to the controller and thus provides the output signal to the controller. In the process flow diagram 400 of FIG. 4, at 410, the orientation of the device is changed. At 420, a sensor detects the change in orientation and provides an output signal to the controller. In one embodiment, for example, the sensor provides an output signal when the device is oriented from resting on one surface portion to resting on another surface portion. In FIG. 2, for example, the sensor provides an output signal when the housing portion 200 is rocked from one surface portion to the next, for example when the housing portion is oriented from resting on the first surface portion 210 to resting on the second surface portion 220. In embodiments where the device is biased to rest on one surface portion or another, the sensor provides an output signal when the device is rocked away from the biased position and toward one of the unstable positions wherein the device returns to rest on the biased position upon removal of the applied force.

In one embodiment, the controller is configured to invoke a change in the mode of operation of the device in response to receiving an output signal from the sensor upon detection of a change in orientation of the device and more particularly of the housing portion. In FIG. 1, for example, the controller is configured to invoke a first mode of operation when the device is oriented to rest on a first surface portion of the housing portion and the controller is configured to invoke a second mode of operation when the device is oriented to rest on the second surface portion of the housing portion. In some embodiments, the device includes a user controlled switch for enabling and disabling the processor's control of the operating mode of the device based on the sensor output. Alternatively, the switch could enable or disable the sensor. When enabled, the processor changes the operating mode of the device in response to changes in the orientation of the device and when disabled the processor does not change the operating mode of the device in response to changes in orientation. The user switch may be a hard or soft switch at the user interface of the device.

In FIG. 1, the processor includes sensor signal response functionality 112 that is responsive to the output signal of the sensor to determine the orientation or change in orientation of the device. More particularly, the processor determines which surface portion of the housing portion is in contact with or intermittently contacts an external surface upon orientation, e.g., rocking or tipping, of the housing portion based on the output signal of the sensor. The processor also includes mode control functionality 114 that changes the operating mode of the device in response to the output signal of the sensor. In the embodiment of FIG. 1, the sensor signal response functionality and the mode control functionality implemented by the processor are controlled by instructions or code stored in memory. Alternatively, this functionality may be performed by equivalent hardware circuits or by a combination of hardware and software.

The change in the mode of operation of the device includes transitioning the electronic device from a power OFF state to a power ON state. The change in the mode of operation also includes transitioning the device between different modes of operation, examples of which are described further below. The mode of operation of the device may be changed by rocking the device from an orientation where the device rests on one surface portion to an orientation where the device rests on another surface portion. In some embodiments, the device remains rested on the surface portion to which it is oriented and in other embodiments the device rest only momentarily and then the device is biased back to the surface portion.

In one implementation, the mode of operation is indicated at the user interface. For example, a change in the mode of operation may be announced at an audio interface or the change may be presented visually at a visual interface, as indicated generally at 440 in the process flow diagram of FIG. 4. Thus the processor in FIG. 1 also includes mode change indication functionality 116 that causes the user interface to indicate the operating mode of the device. In the illustrated embodiment, the mode change indication functionality implemented by the processor is controlled by instructions or code stored in memory. Alternatively, this functionality may be performed by equivalent hardware circuits or by a combination of hardware and software.

In one implementation, the electronic device is a communication device including a communication transceiver. In this implementation, the device includes a mute mode of operation wherein the device does not transmit audible sounds or utterances detected by a user interface microphone. The device also includes an audio loudspeaker mode wherein an audio output of the device is emitted by a loudspeaker designed to be heard without placing the speaker over or adjacent a user's ear. In operation, during an ongoing communication, the controller is configured to operate the device in the audio mute mode when the device is oriented to rest on the first surface portion, for example, the first surface portion 210 in FIG. 2. The mute mode could be indicated audibly or visually. The controller is also configured to operate the device in the audio loudspeaker mode when the device is oriented to rest on another surface portion, for example, the second surface portion 220 in FIG. 2. The speaker mode may be indicated by the enablement of the loudspeaker. The speaker mode may also be indicated by a visual cue displayed on the user interface.

In another implementation, a call send mode is associated with a first surface portion and an end call mode is associated with the second surface portion. The call could be either a voice call or a data session type communication. According to the send/end mode implementation, the controller is configured to initiate a call when the device is oriented to rest on the first surface portion and the controller is configured to end an ongoing call when the device is oriented to rest on the second surface portion. Initiation of the call may be indicated audibly by sounds associated with the call and termination of the call may be indicated by the absence of sounds associated with the call. The call initiation and call termination may also be indicated visually or with other audible cues. Combinations of theses and other functions or operating modes may be associated with corresponding surface portions and the controller may be programmed or configured to invoke the mode or function when the device is oriented to rest, at least momentarily, on the corresponding surface portion. For example, the send, end, mute and speaker modes, or other functions, could be associated with corresponding surface portions 310, 320, 330 and 340 of the housing portion 300 illustrated in the embodiment of FIG. 3.

In another implementation, a call answer mode is associated with a first surface portion and a call reject mode is associated with a second surface portion. According to the call answer/deny mode implementation, the controller is configured to answer an incoming communication when the device is oriented to rest on the first surface portion and the controller is configured to deny and incoming communication when the device is oriented to rest on the second surface portion. Such an implementation could be embodied in a device having a housing portion with three separate surface portions wherein one of the surface portions corresponds to a home orientation. The incoming call could be answered or denied by tipping the device from resting on the home surface portion to resting on one or the other of the surface portions.

Figure 5:
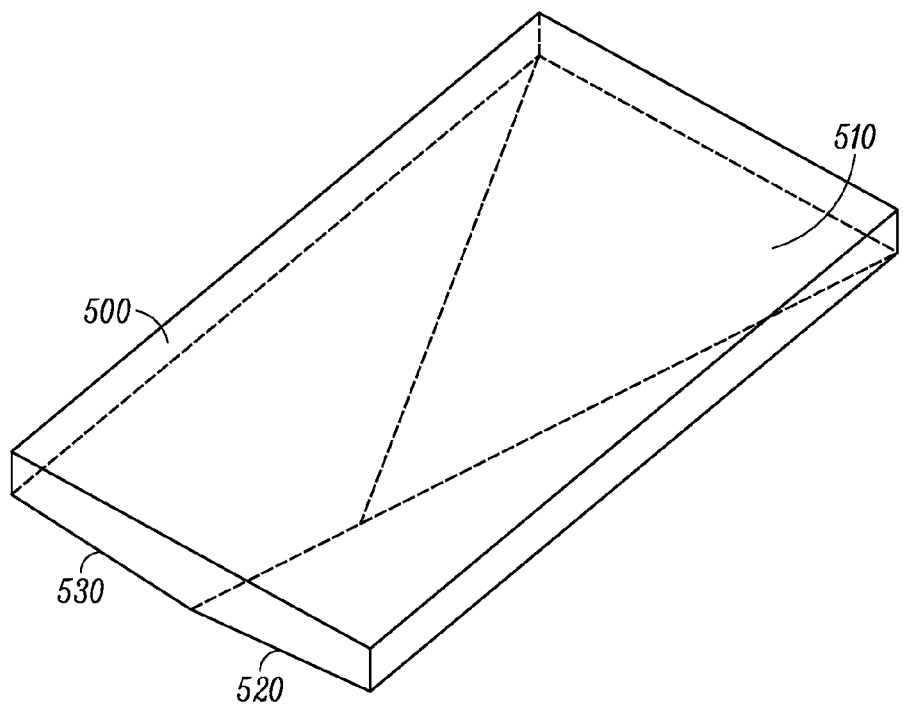
FIG. 5 illustrates a third electronic device housing portion.
Figure 6:
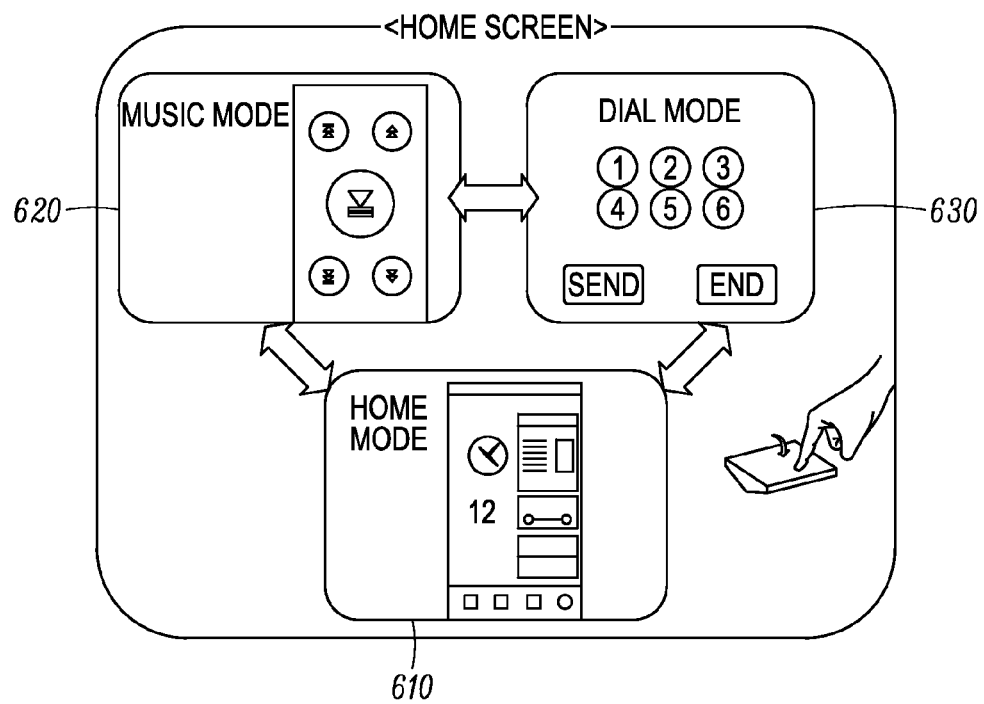
FIG. 6 illustrates exemplary modes that may be invoked upon orienting the device to rest on surface portions illustrated in FIG. 5.

In another implementation, the electronic device is a media device including a media playback and/or recording mode. The media device may be integrated with the communication device described above or with some other electronic device. FIG. 5 illustrates a housing portion 500 having a first surface portion 510, a second surface portion 520, and a third surface portion 530. In one implementation illustrated in FIG. 6, a user interface navigation home mode 610 is associated with the first surface portion 510 of FIG. 5, a media mode 620 in FIG. 6 is associated with the second surface portion 520 of FIG. 5, and a communication mode 630 of FIG. 6 is associated with the third surface portion 530 of FIG. 5. According to this implementation, the controller is configured to transition the device from the home mode to the media mode when the device is oriented from resting on the first surface portion to resting on the second surface portion. The controller is also configured to transition the device from the home mode to the communication mode when the device is oriented from resting on the first surface portion to resting on the third surface portion. More generally, the device will transition between any of the modes illustrated in by orienting the device to rest on a corresponding surface portion.

In a related embodiment, one of the operating modes of the device may be selected in response to a user input at the user interface. For example, upon selecting the media mode by resting the device on the corresponding surface portion of the device, the user may provide another input that associates the surface portions of the housing with functions or modes associated with the media mode. Such a user input could be a touch input or an audio input or some other user input. According to this embodiment, upon associating the surface portions of the housing portion with functions or modes associated with the media mode and providing a user input that selects the mode, further orienting the housing portion will control media mode functions, rather than continue to transition between the media, communication and home modes of operation. In the media mode selection example, surface portions of the device may be associated with play, stop, pause, rewind, forward, zoom-in and zoom-out functions of the media mode. Toggling between resting on two different surface portions may thus be used to control play and stop functions of the media mode. Toggling between resting on two different surface portions may also be used to control zoom-in and zoom-out functions. More generally, transitioning between resting the device on different surface portions will invoke different modes or functions of a selected mode. Alternatively, the user may have selected the communication mode instead of the media mode whereupon the surface portions of the device are associated with functions associated with the communication mode. Still more generally, at one level, changes in the orientation of the device may be used to transition the device among various different high level operating modes (e.g., multimedia, communication, browsing, etc.) of the device. Upon selecting one of the high level operating modes, further changing in the orientation of the device may be used to control functions or modes of operation associated with the selected mode of operation.

In another implementation, the electronic device includes browsing mode functionality. Such a device could be embodied as an Internet browsing device wherein the user may browse web pages or other information. More generally, the browsing mode may also include browsing pages in any electronic file, whether stored locally or at some remote location, like a remote server. Such a device could also be embodied as an electronic book wherein the user may browse pages of the book or an image or photo browsing device wherein the user browses images. Thus according to this embodiment, the controller is configured to cause the device to display a next image in a first mode of operation while displaying an image when the device is oriented to rest on the first surface portion of the housing portion. The controller is also configured to cause the device to display a previous image in a second mode of operation while displaying an image when the device is oriented to rest on the second surface portion. In some embodiments, the controller is configured to refresh an image displayed on the user interface upon orienting the device from resting on one surface portion to resting on the second surface portion and then resting back on the first surface portion in a relatively continuous motion. Alternatively, the image refresh functionality could be invoked by transitioning the device to one particular surface portion without continuously transitioning between surface portions.

Figure 7:
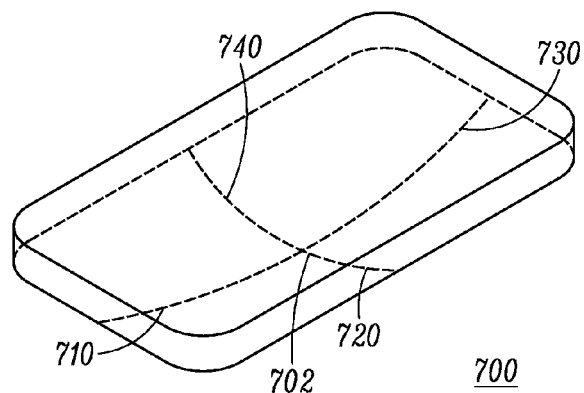
FIG. 7 illustrates a fourth electronic device housing portion.

In FIG. 7, the housing portion 700 comprises a curved surface portion including a first surface portion 710, a second surface portion 720, a third surface portion 730 and a fourth surface portion 740. The surface portions constitute a relatively continuously curved surface devoid of the ridge-like boundaries in the embodiments of FIGS. 2, 3 and 5. In the embodiment of FIG. 6, a different operating mode of the device is associated with each quadrant. In other embodiments, a greater or lesser number of surface portions of the housing portion may be associated with different mode of operation of the device. Also, the curved surface portion of the housing portion may lack symmetry. The device of FIG. 7 is biased to rest in a neutral position on or about the rest point 702, assuming a relatively equal weight distribution. A variation in the weight distribution or a variation in the symmetry of the housing surface may result in a shift in the location of the rest point. Tipping or rocking the housing portion 700 from the home position toward any other surface portion causes the housing portion to return to the home position.

Figure 8:
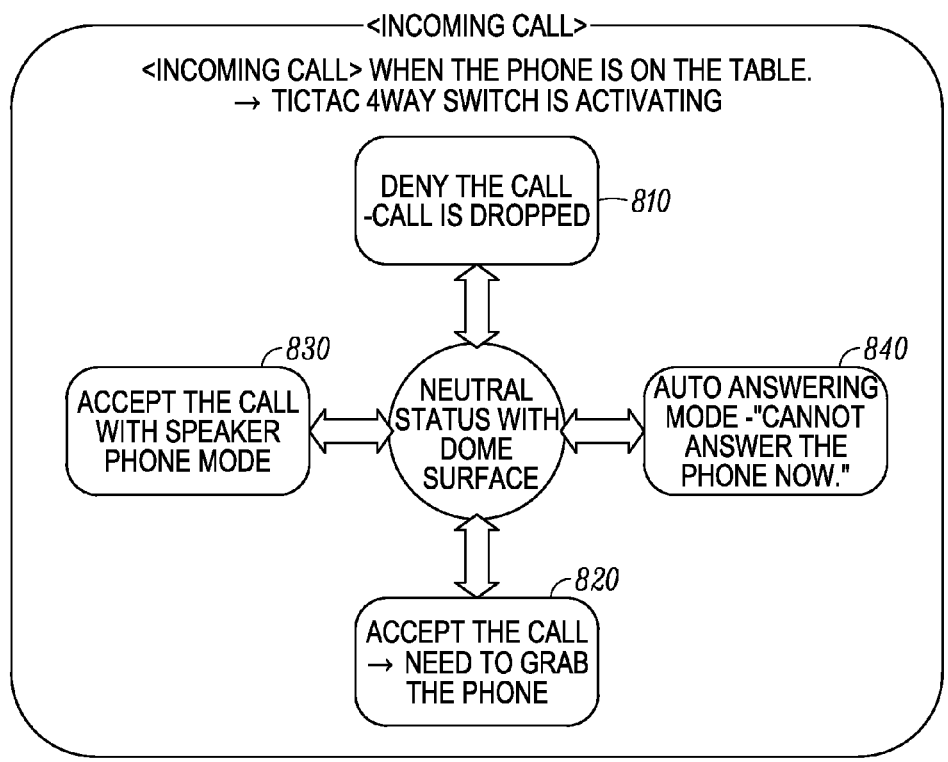
FIG. 8 illustrates some other exemplary modes that may be invoked upon orienting the device to rest on surface portions illustrated in FIG. 7.

In FIG. 8, various modes of operation of functions associated with a communication mode of operation of an electronic device are associated with different surface portions of a housing portion. In one embodiment, the modes of operation illustrated in FIG. 8 are associated with the surface portions 710, 720, 730 and 740 illustrated in FIG. 7. Alternatively, the modes of operation of FIG. 8 may be associated with the surface portions 310, 320, 330 and 340 illustrated in FIG. 3 wherein the home or neutral position corresponds to the surface portion 350. With reference to FIGS. 7 and 8, the housing portion is rests in the neutral or home position associated with the surface portion 702. In FIG. 8 the communication mode could be a default mode or it could be a mode that is selected by the user of the device, as discussed herein. In response to an incoming call, in the communication mode, rocking the housing portion toward the first surface portion 710 in FIG. 7 could invoke the call denial mode or function 810 in FIG. 8 wherein the call is dropped or terminated. Rocking the housing portion toward the surface portion 730 in FIG. 7 invokes acceptance of the call at 820 in FIG. 8 wherein the user must place the handset or device adjacent the user's ear. Rocking the housing portion toward the surface portion 720 in FIG. 7 invokes call acceptance in loud speaker mode at 830 in FIG. 8. Rocking the housing portion toward the surface portion 740 in FIG. 7 directs the call to an answering system 840 in FIG. 8 wherein the caller may leave a voicemail message. In other embodiments, other functions may be associated with different surface portions of the housing portion. Similarly, modes of operation other than the communication mode may be associated with the different surface portions of the device.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A portable electronic device comprising:
    a housing portion having at least a first surface portion corresponding to a first facet on the housing portion and having a second surface portion corresponding to a second facet on the housing portion, wherein the first facet and the second facet are non-parallel and intersect at a boundary, and wherein the device may be oriented to rest on not more than one of the first surface portion and the second surface portion at a particular time;
    a user interface:
    a sensor configured to provide an output signal when the device is oriented from resting on the first surface portion to resting on the second surface portion; and
    a controller coupled to the user interface and to the sensor, the controller configured to invoke a mode of operation of the device in response to receiving the output signal from the sensor,
    wherein the mode of operation of the device may be changed by rocking the device from an orientation where the device rests on the first facet to an orientation where the device rests on the second facet; and
    wherein the mode of operation is indicated at the user interface.

2. The device of claim 1, wherein the first facet is a first flat surface, the second facet is a second flat surface and the boundary is a ridge.

3. The device of claim 1, wherein the controller is configured to invoke a first mode of operation when the device is oriented to rest on the first surface portion and the controller is configured to invoke a second mode of operation when the device is oriented to rest on the second surface portion.

4. The device of claim 1 is a communication device, wherein the controller is configured to operate the device in an audio mute mode during an ongoing communication when the device is oriented to rest on the first surface portion and the controller is configured to operate the device in an audio loudspeaker mode during an ongoing communication when the device is oriented to rest on the second surface portion.

5. The device of claim 1 is a browsing device configured to display images on the user interface,
    the controller is configured to cause the device to display a next image in a first mode of operation while displaying an image when the device is oriented to rest on the first surface portion, and
    the controller is configured to cause the device to display a previous image in a second mode of operation while displaying an image when the device is oriented to rest on the second surface portion.

6. The device of claim 5, wherein the controller is configured to refresh an image displayed on the user interface upon orienting the device from resting on the first surface portion to resting on the second surface portion and then resting back on the first surface portion in a relatively continuous motion.

7. The device of claim 1 is a media device, wherein the controller is configured to operate the device in a first media control mode of operation when the device is oriented to rest on the first surface and the controller is configured to operate the device in a second media control mode of operation when the device is oriented to rest on the second surface portion.

8. The device of claim 1 further comprises a home screen visually displayed on the user interface, wherein the controller is configured to operate the device in an application controlled mode of operation when the device is oriented to rest on the first surface portion, wherein the application controlled mode of operation is indicated on the user interface.

9. The device of claim 1,
    the housing portion comprises a curved surface portion including a home surface portion, the first surface portion and the second surface portion, wherein the device is biased to rest on the home surface portion when the device is rocked to rest on the first surface portion or to rest on the second surface portion,
    the controller configured to invoke the first mode of operation when the device is oriented to intermittently rest on the first surface portion and to invoke the second mode of operation when the device is oriented to intermittently rest on the second surface portion.

10. A method in a hand manipulatable electronic device, the method comprising:
orienting the device from resting on a first surface portion corresponding to a first facet on the housing portion of the device to resting on a second surface portion corresponding to a second facet on the housing portion of the device, wherein the first facet and the second facet are non-parallel and intersect at a boundary;
providing an output signal with a sensor in response to detecting the change in orientation of the device;
invoking a mode of operation of the device in response to the output signal provided by the sensor;
changing the mode of operation when the device is rocked from an orientation where the device rests on the first facet to an orientation where the device rests on the second facet;
indicating the mode of operation at a user interface of the device.

11. The method of claim 10, operating the device to operate in an audio mute mode during an ongoing communication when the device is oriented to rest on the first surface portion and operating the device in an audio loudspeaker mode during an ongoing communication when the device is oriented to rest on the second surface portion.

12. The device of claim 10 further comprising
causing the device to display a next image in a first mode of operation while displaying an image when the device is oriented to rest on the first surface portion, and
causing the device to display a previous image in a second mode of operation while displaying an image when the device is oriented to rest on the second surface portion.

13. The method of claim 12 further comprising refreshing an image displayed on the user interface upon orienting the device from resting on the first surface portion to resting on the second surface portion and then resting back on the first surface portion in a relatively continuous motion.

14. The method of claim 10 further comprising operating the device in a first media control mode of operation when the device is oriented to rest on the first surface and operating the device in a second media control mode of operation when the device is oriented to rest on the second surface portion.

15. The method of claim 10 further comprising operating the device in an application controlled mode of operation when the device is oriented to rest on the first surface portion and indicating the application controlled mode of operation on the user interface.

16. The method of claim 10 further comprising
biasing the device to rest on a home surface portion of the housing when the device is oriented to rest on the first surface portion or to rest the second surface portion,
invoking the first mode of operation when the device is oriented to intermittently rest on the first surface portion and invoking the second mode of operation when the device is oriented to intermittently rest on the second surface portion.

* * * * *